United States Patent
Clark, III et al.

(10) Patent No.: US 11,383,746 B1
(45) Date of Patent: Jul. 12, 2022

(54) ADJUSTABLE TRAY ASSEMBLY

(71) Applicants: Jack G. Clark, III, Cedar Hill, TX (US); Nichole M. Clark, Cedar Hill, TX (US)

(72) Inventors: Jack G. Clark, III, Cedar Hill, TX (US); Nichole M. Clark, Cedar Hill, TX (US)

( * ) Notice: Subject to any disclaimer, the term of this patent is extended or adjusted under 35 U.S.C. 154(b) by 0 days.

(21) Appl. No.: 16/853,054

(22) Filed: Apr. 20, 2020

Related U.S. Application Data

(60) Provisional application No. 62/835,987, filed on Apr. 18, 2019.

(51) Int. Cl.
*B62B 3/14* (2006.01)
*B62B 5/08* (2006.01)

(52) U.S. Cl.
CPC .............. *B62B 3/1468* (2013.01); *B62B 5/08* (2013.01)

(58) Field of Classification Search
CPC ....... B62B 3/1468; B62B 5/08; B62B 3/1416; B62B 3/144; B62B 3/1456; F16B 2/10
See application file for complete search history.

(56) References Cited

U.S. PATENT DOCUMENTS

| | | | |
|---|---|---|---|
| 4,674,758 A | 6/1987 | Valley et al. | |
| 4,908,913 A * | 3/1990 | Mori | F16B 45/02 24/599.4 |
| 5,086,960 A * | 2/1992 | Schwietzer | B62B 3/1428 248/456 |
| 5,193,773 A * | 3/1993 | Middleton | E04D 15/00 248/148 |
| 5,425,546 A | 6/1995 | Gerber et al. | |
| D484,644 S | 12/2003 | Arceta | |
| D583,123 S | 12/2008 | Cassin, III | |
| 7,926,152 B2 * | 4/2011 | Emenheiser | F16B 45/02 24/600.9 |
| 8,534,520 B1 * | 9/2013 | Liparoti | B62B 3/1428 224/282 |
| 8,757,666 B1 * | 6/2014 | Santore | B42D 5/006 281/42 |
| 9,120,496 B1 * | 9/2015 | Griffith | B62B 5/00 |
| 9,669,856 B2 | 6/2017 | Hunt | |
| D806,976 S | 1/2018 | Peota et al. | |
| 10,179,599 B1 * | 1/2019 | Lambrecht | B62B 3/1428 |
| 2004/0069918 A1 * | 4/2004 | McKinney | B62B 3/1428 248/274.1 |

(Continued)

FOREIGN PATENT DOCUMENTS

WO    WO-2013036964 A1 *   3/2013    ............... A47C 4/00

*Primary Examiner* — James A Shriver, II
*Assistant Examiner* — Michael T. Walsh
(74) *Attorney, Agent, or Firm* — Law Office of Jeff Williams PLLC; J. Oliver Williams

(57) ABSTRACT

An adjustable tray assembly is configured to span a distance between the handle of a shopping cart to the backrest of the seat area. The assembly is adjustable to different sizes of shopping carts by utilizing an attachment member within a tray portion at the handle that can be located in different positions, and by permitting the pivoting of an arm portion of the assembly. The pivoting nature of the arm portion allows the arm portion to adjust to the different depth of the seat areas and type of cart. A latch is used to secure the arm portion to the backrest of the seat area. A hollowed area is formed in the arm portion for a child to use the seat area.

9 Claims, 8 Drawing Sheets

(56) References Cited

U.S. PATENT DOCUMENTS

| | | |
|---|---|---|
| 2005/0057080 A1 | 3/2005 | Collins |
| 2007/0114738 A1* | 5/2007 | Jones ................. B62B 5/087 |
| | | 280/32.7 |
| 2007/0273113 A1 | 11/2007 | Muir |
| 2016/0339937 A1* | 11/2016 | Dyer ................... B62B 3/144 |
| 2018/0187829 A1* | 7/2018 | Bacallao ............ B62B 3/1428 |
| 2021/0024113 A1* | 1/2021 | Bar-Or ............... B62B 5/0016 |

* cited by examiner

ADJUSTABLE TRAY ASSEMBLY

CROSS REFERENCE TO RELATED APPLICATIONS

This application claims the benefit of earlier filing date and right of priority to U.S. Provisional Application No. 62/835,987, filed 18 Apr. 2019, the contents of which is incorporated by reference herein in its entirety.

BACKGROUND OF THE INVENTION

1. Field of the Invention

The present application relates to a tray assembly, and more particularly to an adjustable tray assembly for coupling to a shopping cart to help restrain children.

2. Description of Related Art

Shopping carts are prevalent within society and are used in most mainstream stores for carrying goods both prior to payment and after payment. Most shopping carts are designed to allow for a child to sit at the front of the cart next to the handle used to push the shopping cart. The child is set to face the user. Each shopping cart typically has a back rest, seat and front handle area. As children can be various sizes, the space in the seat is plentiful, thereby allowing children in the seats to move and escape. This can be dangerous for children. Approximately 24,000 children are injured in shopping cart accidents every year: fractured skulls, concussions, and sometimes even death.

Despite the good intentions of users and the store owners, often the carts are dysfunctional, allowing for proper securing of a child impossible. Straps meant to secure the child are often broken, torn, or not able to adjust around the child, thus leaving him/her unsecured and free to move around as he/she pleases. However, even when buckled in properly, certain kids are prone to escaping or unlatching themselves. Regardless of the situation, this creates a very stressful shopping experience for the parent and a safety concern for the child.

Some devices have been developed to attempt to cure these issues, however, they are all deficient. Some of the main concerns is that the devices are not compatible with a majority of shopping carts. Shopping carts can vary in material and size between stores. Additionally, the devices fail to adequately secure the child as they generally don't surround the child or secure along multiple points to the cart, both in front of and behind the child.

Although strides have been made to provide a safe seating place in the cart, considerable shortcomings remain. It is desired that a tray assembly be design to function with 80-90% of all shopping carts across the US, making it practically universal while providing proper restraint for the child.

BRIEF SUMMARY OF THE INVENTION

It is an object of the present application to provide an adjustable tray assembly configured to extend between a backrest and a handle of a shopping cart. The assembly spans over the seat area and is configured to restrict the movement of a child once he/she is buckled into the seat area of a shopping cart. Additionally, the adjustable tray assembly is configured to provide a suitable surface to entertain the child while the parent is shopping.

An object of the present application is to provide an adjustable tray assembly designed to function with 80-90% of all shopping carts across the US, making it practically universal. Shopping carts are sized differently and therefore to compensate for changes in design, the adjustable tray assembly is configured to fold between pre-set locking positions to permit attachment to the backrest. Likewise, the adjustable tray assembly includes an attachment member that can selectively translate to properly grasp the handle of the shopping cart.

A further object is to provide a simple means of storage and portability. The adjustable tray assembly can fold over on itself combining the two distinct half portions. A user is then able to easily fit the assembly in a bag and carry it with its own handle.

Ultimately the invention may take many embodiments. In these ways, the present invention overcomes the disadvantages inherent in the prior art. The more important features have thus been outlined in order that the more detailed description that follows may be better understood and to ensure that the present contribution to the art is appreciated. Additional features will be described hereinafter and will form the subject matter of the claims that follow.

Many objects of the present application will appear from the following description and appended claims, reference being made to the accompanying drawings forming a part of this specification wherein like reference characters designate corresponding parts in the several views.

Before explaining at least one embodiment of the present invention in detail, it is to be understood that the embodiments are not limited in its application to the details of construction and the arrangements of the components set forth in the following description or illustrated in the drawings. The embodiments are capable of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present design. It is important, therefore, that the claims be regarded as including such equivalent constructions insofar as they do not depart from the spirit and scope of the present application.

BRIEF DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
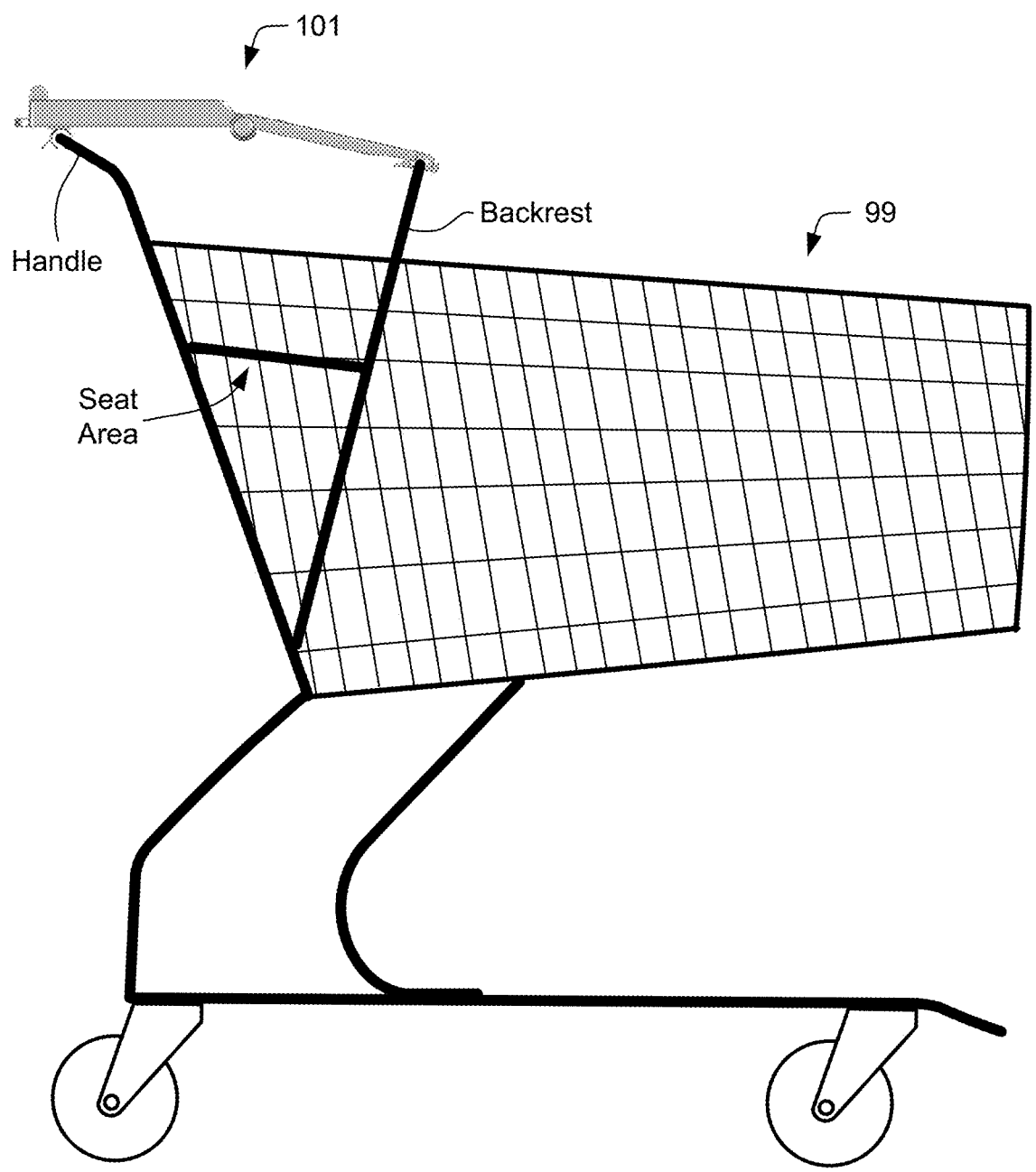
FIG. 1 a side view of an adjustable tray assembly on a shopping cart according to an embodiment of the present application.

While the embodiments and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE INVENTION

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the embodiments described herein may be oriented in any desired direction.

The embodiments and method will be understood, both as to its structure and operation, from the accompanying drawings, taken in conjunction with the accompanying description. Several embodiments of the assembly may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

Referring now to the Figures wherein like reference characters identify corresponding or similar elements in form and function throughout the several views. The following Figures describe embodiments of the present application and its associated features. With reference now to the Figures, embodiments of the present application are herein described. It should be noted that the articles "a", "an", and "the", as used in this specification, include plural referents unless the content clearly dictates otherwise.

Referring now to FIG. 1 in the drawings, a side view of an adjustable tray assembly 101 is illustrated attached to an upper seat area of a shopping cart 99. The embodiments and method of the present application is illustrated in the associated drawings. Assembly 101 is configured to extend over the seat area between the handle of cart 99 and the backrest of the seat area. A child sits in the seat area and is partially surrounded along the sides as he/she sits in the seat area. The child is provided a surface to interact with on assembly 101 which may assist in entertaining and in some way restraining the child while the adult shops. Additional features and functions are illustrated and discussed below.

The adjustable tray assembly of the present application is configured to further restrict the movement of a child once he/she is buckled into the front seat of a shopping cart, and to provide a suitable surface to entertain the child while the parent is shopping. The adjustable tray assembly of the present application is designed to function with 80-90% of all shopping carts across the US, making it practically universal.

Figure 2:
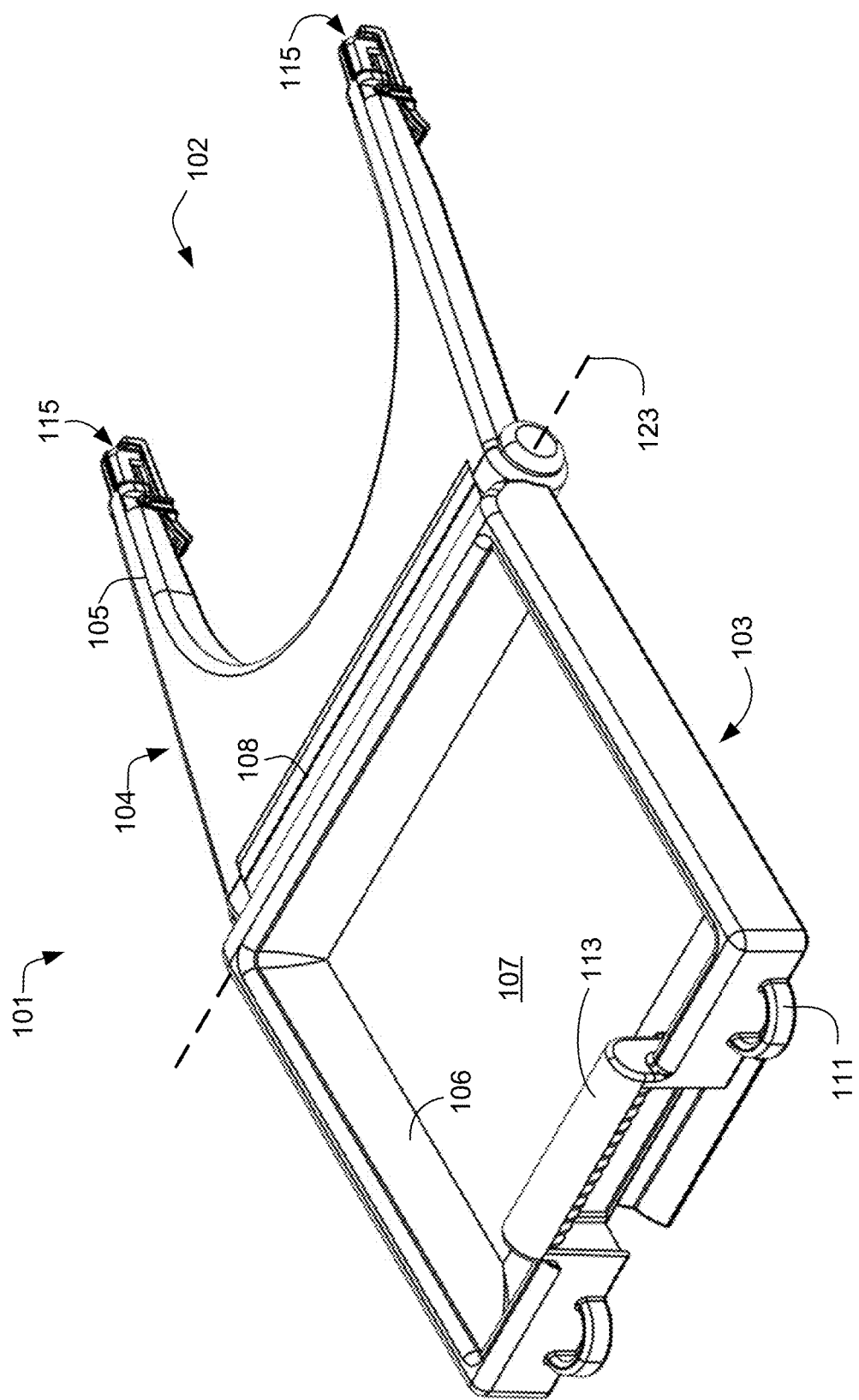
FIG. 2 is an upper perspective view of the adjustable tray assembly of FIG. 1.
Figure 3:
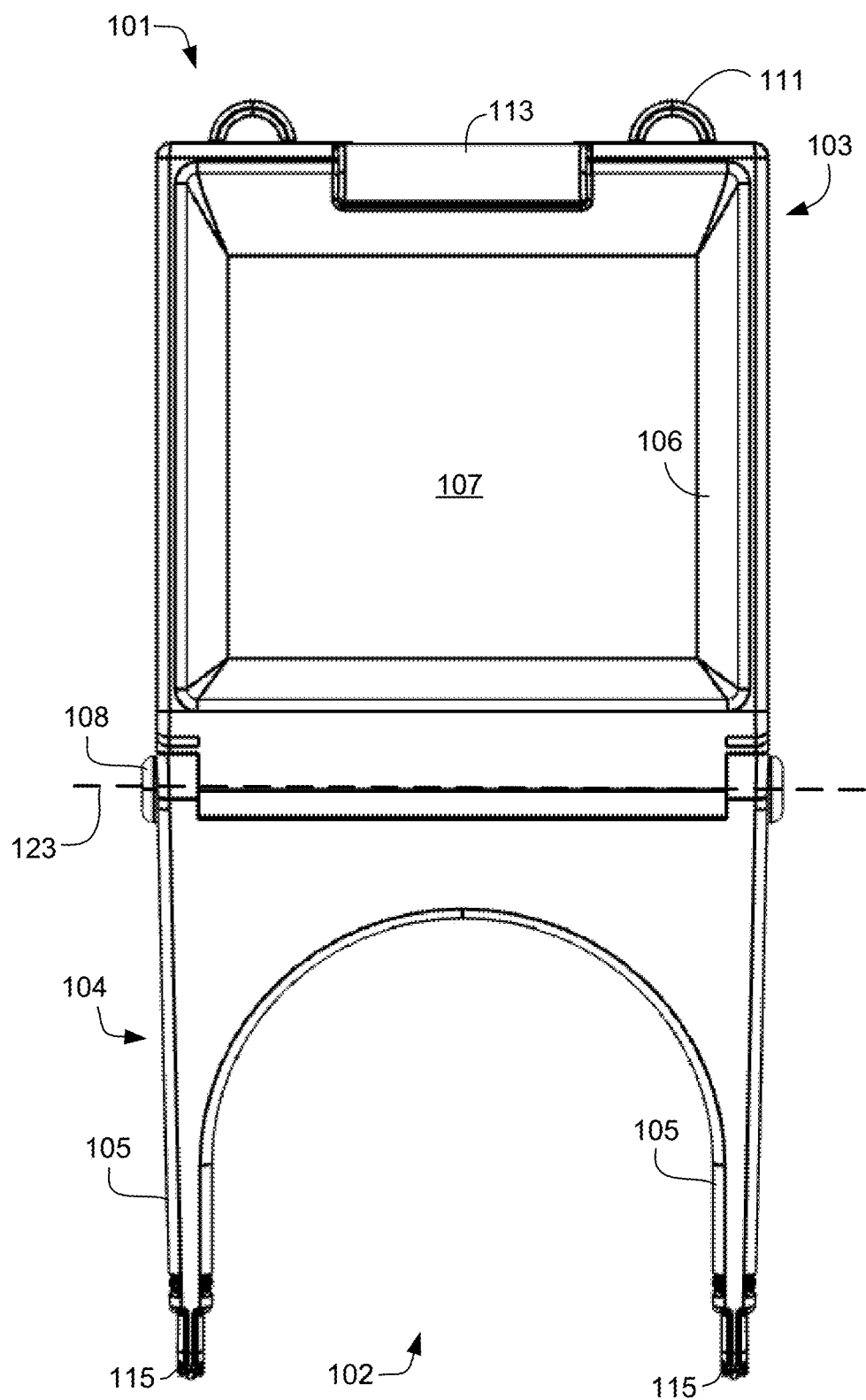
FIG. 3 is a top view of an adjustable tray assembly of FIG. 2.

Referring now to FIGS. 2-3 in the drawings, views of an adjustable tray assembly 101 are illustrated. Assembly 101 includes a tray portion 103 and an arm portion 104. A hinge 108 couples portions 103 and 104 together. Hinge 108 also permits the rotational adjustment of arm portion 104 relative to tray portion 103. Arm portion 104 is designed to surround a child within a hollow area 102, on at least three sides. The seat back of the shopping cart provides the fourth side to create the defined hollow area 102. The child rests within area 102 when properly installed on the shopping cart.

Tray portion 103 is a relatively flat component with a sunken central area 107 with raised sides 106. Sides 106 surround the perimeter of central area 107 as seen in the Figures. The full perimeter is preferred as this helps to prevent contents within area 107 from spilling. Within sides 106 may be external hooks/clips/mounts 111 that can be used to hold various child toys, soothing devices (i.e. pacifier), or other objects. These may be formed into sides 106, both inwardly or outwardly as seen in FIGS. 2 and 3. Some embodiments may include hooks/clips/mounts that are detachable.

The contour of the sunken central area 107 can be modified or molded to be at least one of flat, sloped, or curved. A cup holder (not shown) can optionally be formed in area 107. For example, the cup holder may be a depression or raised extrusion from the surface of area 107. The cup holder is configured to hold a cup, can, bottle, or other drinking vessel and may be formed to varied depths or shapes. A child can also use the surface of area 107 to play, eat, or draw on. The goal is that the child is occupied and "distracted" enough to not try to escape the basket or grab at random shopping items.

Further coupled to sides 106 is an attachment bar 113 which extends above sides 106 of tray portion 103. The shape of bar 113 is not herein limited to a cylinder as shown. Bar 113 is configured to accept and support one or more electronic devices by providing a surface to releasably couple to. In practice, a user (i.e. parent) may attach a phone with a shopping list to bar 113. Alternatively, a device for the child may be attached wherein the screen faces the child for entertainment. During storage of assembly 101, bar 113 may be used as a handle for transportation. It is understood that one or more bars 113 are possible and may be located adjacent to any sides 106 around the perimeter. Bars 113 may be molded into sides 106 or be detachable.

Arm portion 104 is hingedly coupled to a side of tray portion 103 through hinge 108. Arm portion 104 includes a body and a set of arms 105. Arms 105 are narrowed elongated sections that extend away from the body opposite hinge 108 and are configured to releasably couple to the backrest of the shopping cart seat area. Attachment thereto is accomplished through the use of latches 115. The body has a concaved or recessed profile extending between arms 105 to form hollow area 102.

Figure 8:
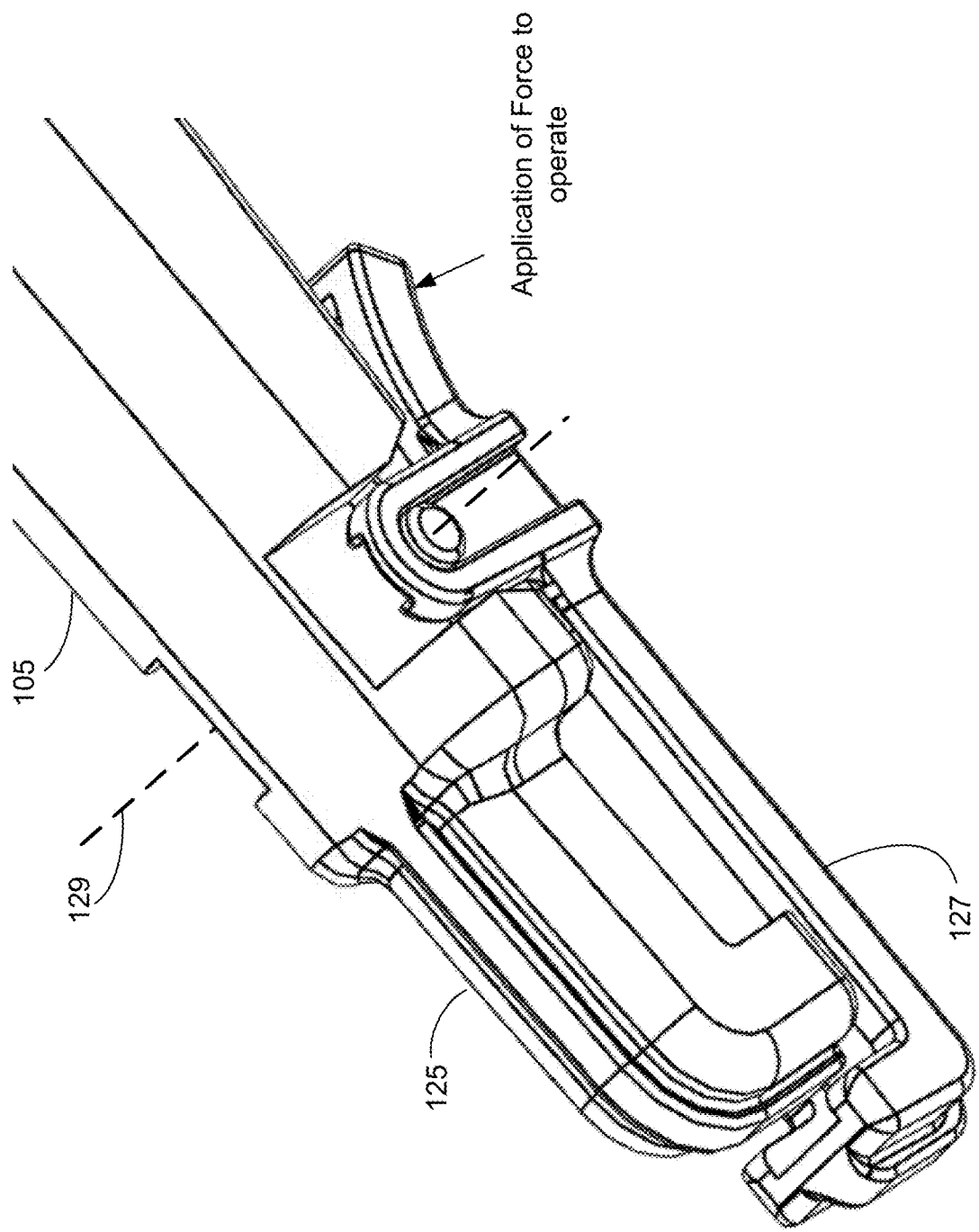
FIG. 8 is an enlarged upper perspective view of a latch in the adjustable tray assembly of FIG. 2.

Referring now also to FIG. 8 in the drawings, a perspective view of latch 115 is shown. Latches 115 are coupled to a distal end of arms 105 and include a lower and an upper curved member. The upper curved member 125 is rigidly secured relative to the arms 105. The lower curved member 127 pivots about an axis 129 between a closed position and an open position. A tensioning/compressing device (i.e. a spring) is used to maintain a closed position when at rest. An application of force to the lower curved member opens the latch and permits acceptance of the backrest of cart 99. When closed, the curved portions of the curved members overlap wherein the upper curved member is situated within the lower curved member.

The use of two curved members helps to prevent a child from lifting or pushing on arm portion 104 trying to dislodge latches 115. It is understood that latch 115 may be spring activated latch wherein opposing sides are biased about a spring. Other embodiments may include other means for opening and closure. Other such embodiments may or may not require any biasing elements. Of note is that latches 115 extend beyond the distal end of arms 105 so as to permit them to pass through and/or around the openings in the back rest of the seat area. In shopping carts, the backrest is typically a metal wire structure. However, some carts use thickened plastic with smaller holes. These holes may be too small for arms 105 to pass through, which necessitates the need for latches 115 to extend beyond the end of arms 105 so as to pass through the holes. In operation each arm 105 is secured to the backrest of the shopping cart.

Furthermore, portion 103 and arm portion 104 can be made from any type of material, however, it is desired that the material provides some flexibility to allow it to adjust to slight variations in shopping carts. Examples of materials may be plastics and composites.

Figure 4:
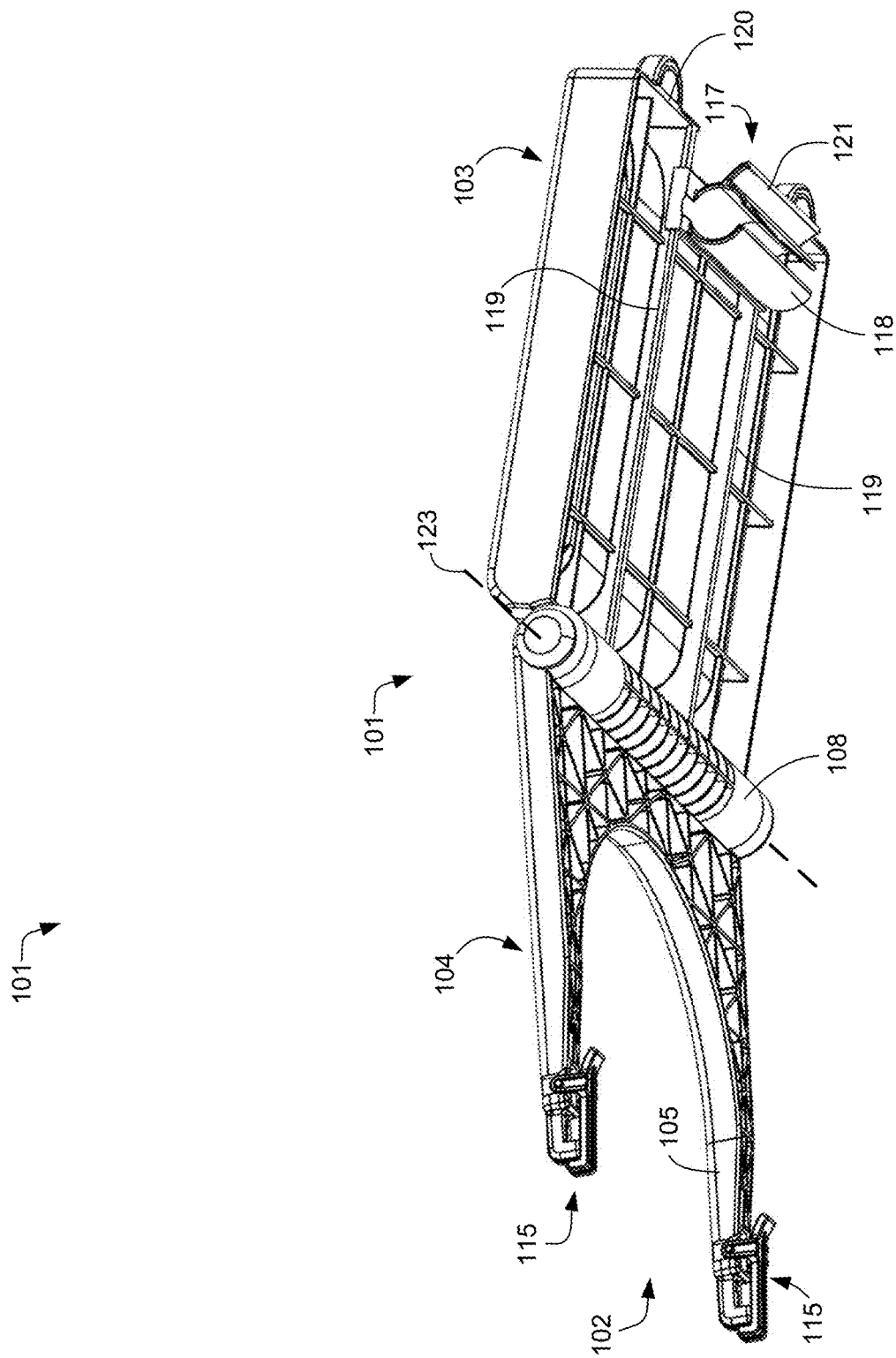
FIG. 4 is a lower perspective view of the adjustable tray assembly of FIG. 2.
Figure 5:
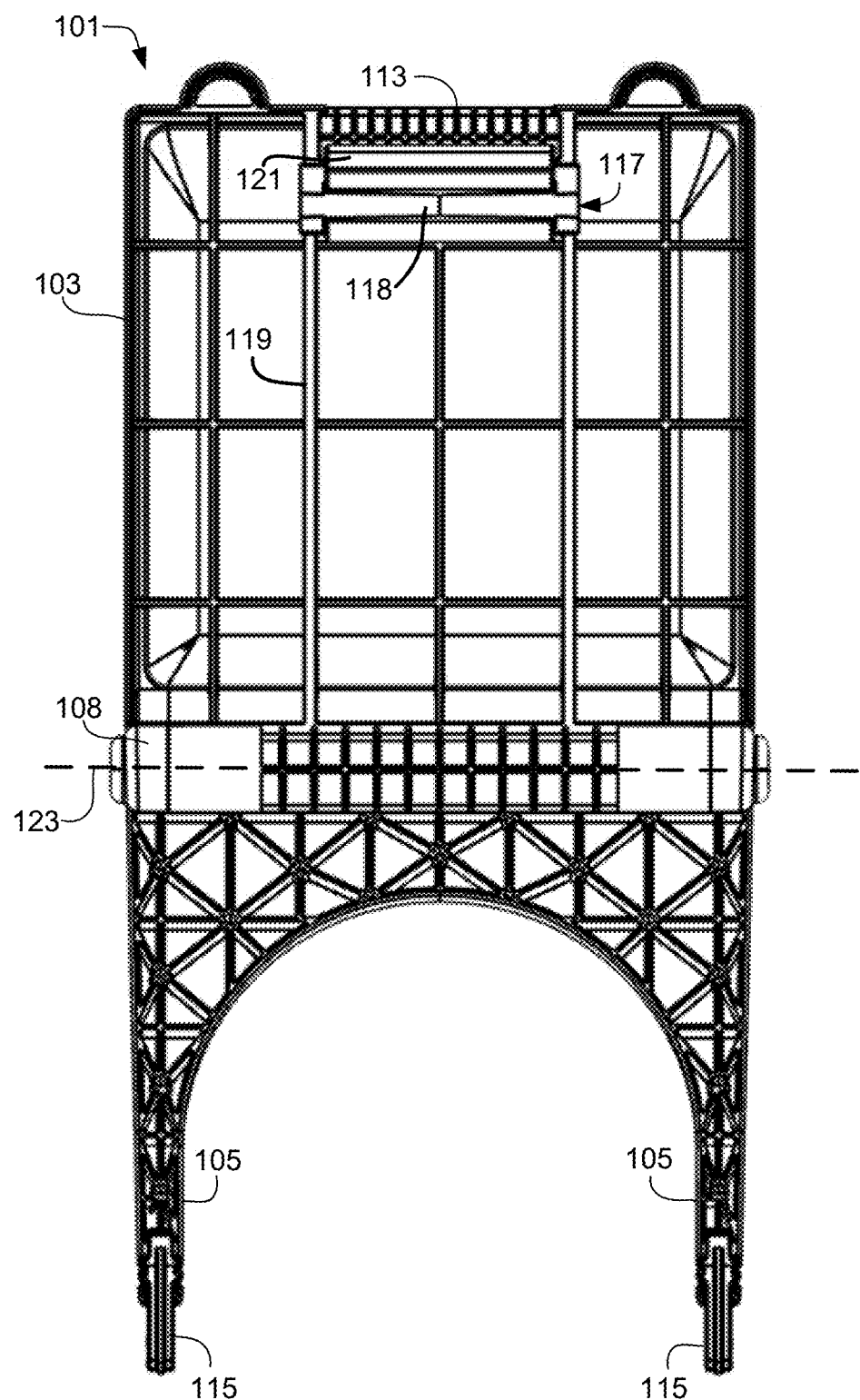
FIG. 5 is a bottom view of the adjustable tray assembly of FIG. 2.
Figure 7:
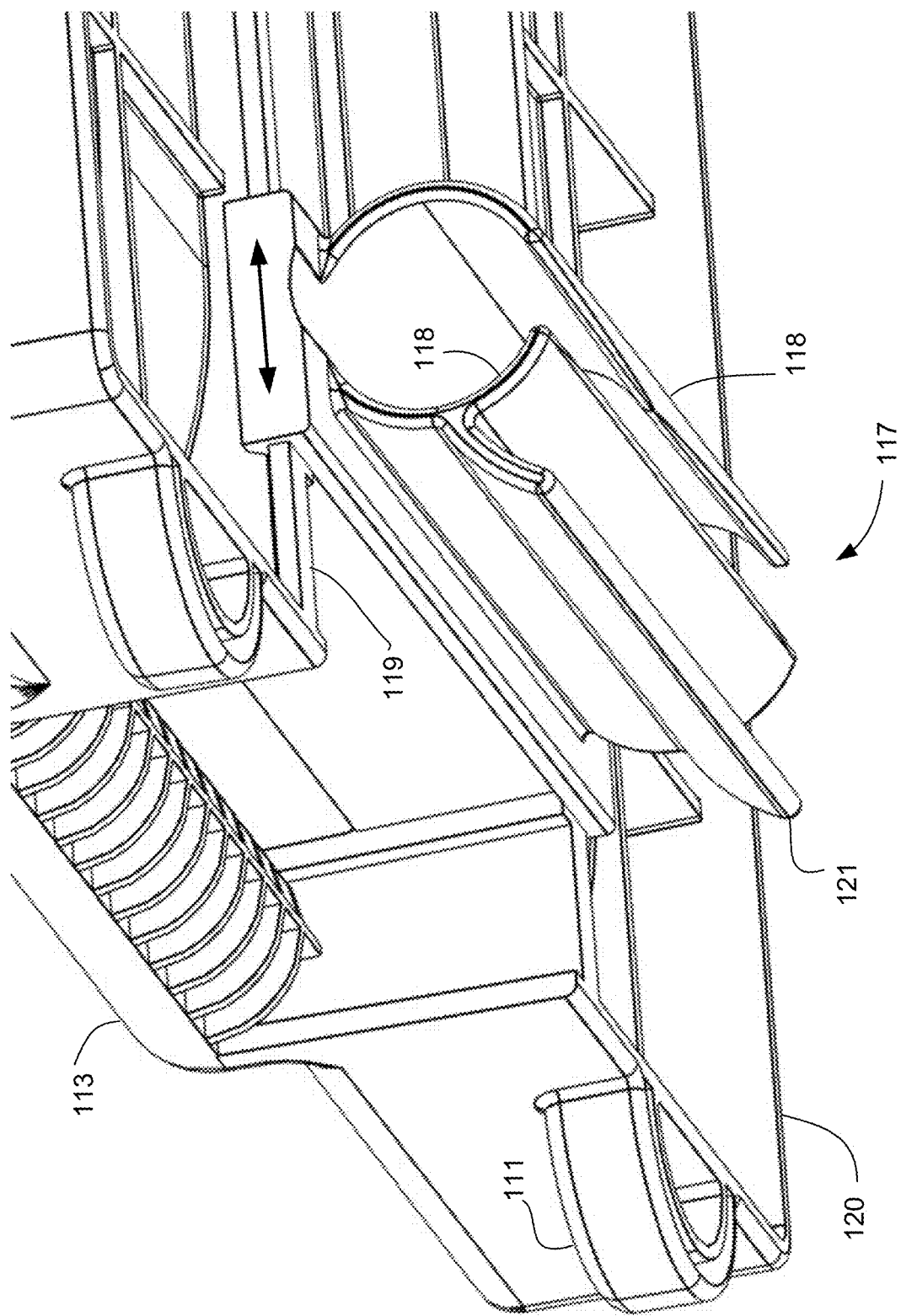
FIG. 7 is an enlarged lower perspective view of an attachment device in the adjustable tray assembly of FIG. 2.

Referring now also to FIGS. 4, 5, and 7 in the drawings, lower views of assembly 101 are shown. In this view an attachment member 117 is shown. Whereas latches 115 are used to couple the arms 105 to the shopping cart at the rear of assembly 101, member 117 is used to releasably couple tray portion 103 to the shopping cart. Member 117 is located on a lower surface 120 of tray portion 103 and is configured to translate forward and backward along a track 119. This allows member 117 to accommodate for the various depths of different shopping carts (depth being the distance between the main shopping cart handle and the rear of the child's seat at the backrest). Track 119 may be a recess or protrusion from the lower surface, or any combination therebetween. Track 119 permits longitudinal movement of member 117 both forwards and backwards. In some embodiments, member 117 may be free sliding within track 119 or may have standard set positions that lock or set the relative position of member 117.

Member 117 is configured to releasably couple to the handle of the shopping cart. It can accommodate the various diameters of the shopping cart handles, which may vary from approximately 0.75 inches to 1.50 inches in diameter, for example. To do this, member 117 needs to be adjustable in size. As seen in FIGS. 4, 5, and 7, member 117 is a C-shaped cylindrical body/device with opposing sides 118 that can pivot to open and close an opening therein. A slit is formed in the body to form the opposing sides. Member 117 includes a handle 121 coupled to at least one of the opposing sides 118. The handle 121 is positioned so as to be on the side closest to the user opposite hinge 108. This location assists adjustment and operation by an adult and hinders a child's ability to reach forward and around the side sufficiently to operate handle 121 so as to release member 117.

As seen in the Figures, the cylindrical body of member 117 is axially parallel to that of hinge 108. It is understood that the physical depiction of member 117 is not intended to be limiting as it is known that many different types of attachment methods may be used. Member 117 is ideally suited for quick attachment and detachment and is configured to facilitate the operation for an adult and hinder the operation of it by a child situated in the seat area of cart 99.

Figure 6:
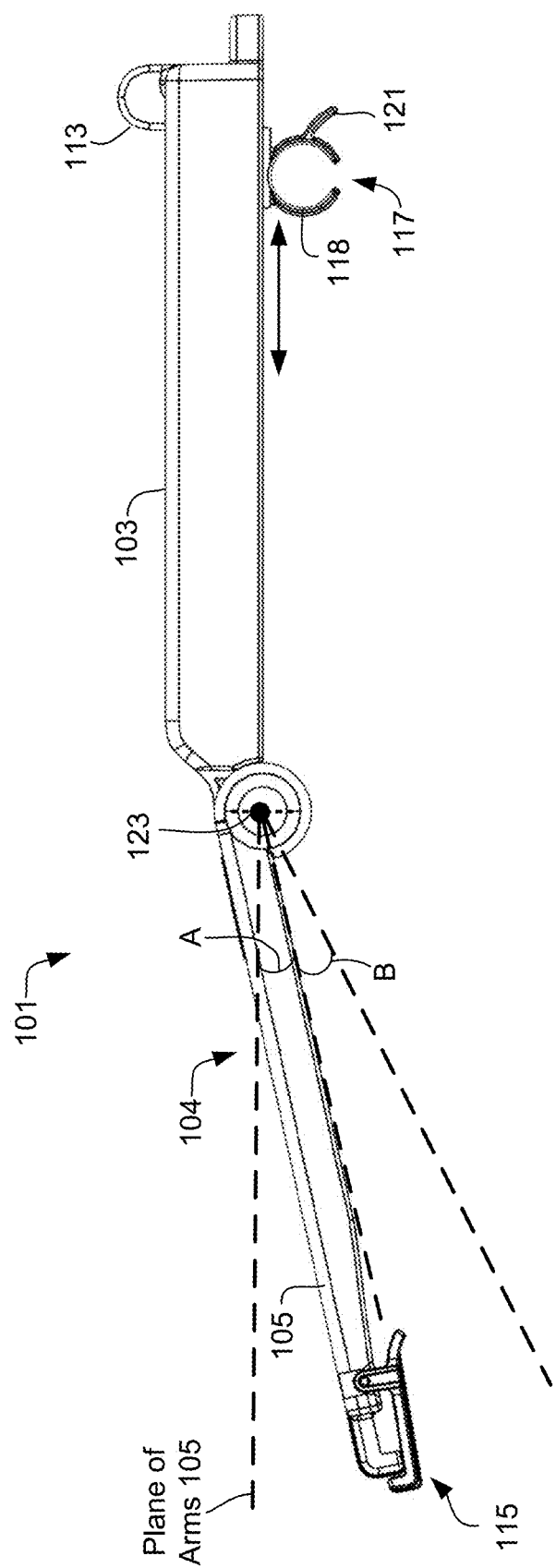
FIG. 6 is side view of the adjustable tray assembly of FIG. 2.

Referring now also to FIG. 6 in the drawings, a side view of assembly 101 is illustrated. Assembly 101 creates both a physical and even a psychological barrier that greatly restricts the movement of the child once seated in the shopping cart. It is noted that shopping carts are sized differently in the seats for children. As assembly 101 is configured to operate with a majority of shopping carts, it is preferred that assembly 101 be able to pivot arm portion 104 relative to tray portion 103. As seen in FIG. 6, arm portion 104 pivots about a hinge axis 123 of hinge 108. Hinge 108 can be of many types and varieties. Suitable types permit the arm portion 104 to pivot without causing increased potential to harm a child through pinching or sharp edges. A potential suitable example would be a living hinge. As seen in FIG. 6, arm portion 104 may pivot downward and/or upward to any angle, such as angle A (15 degrees) or angle B (30 degrees). Arm portion 104 is shown locked in a position defined by angle A. The angle may be freely adjustable or may be set/locked through one or more locking positions within hinge 108. The goal is to have the tray remain close to the child's torso instead of being so high that it's close to the child's neck.

Another feature of assembly 101 is that ability to be collapsible for ease of transportation. Arms 105 may be rotated completely downward such that the lower surfaces of tray portion 103 and arms 105 contact one another. These may be latched into a secured position wherein this closed or transporting position is one of the locking positions of hinge 108. In such position, member 117 is situated between arms 105. A user may then use bar 113 as a handle to carry assembly 101.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. An adjustable tray assembly, comprising:
a tray portion having a hinge along a first side;
a translating attachment member coupled to a lower surface of the tray portion, the attachment member configured to translate toward and away from the hinge;
an arm portion hingedly coupled to the first side of the tray portion at the hinge, the arm portion including a set of arms to define an opening therebetween opening away from the hinge; and
a latch coupled to a distal end of each of the set of arms;
wherein the arm portion is configured to extend away from the tray portion in an unfolded position; and
wherein the translating attachment member is configured to adjust the distance between itself and the latches to facilitate different attachment points.

2. The assembly of claim 1, wherein the attachment member is a cylindrical body with a slit along its length to permit the cylindrical body to open and close.

3. The assembly of claim 2, wherein the translating attachment member is aligned parallel to the hinge.

4. The assembly of claim 1, wherein the latch extends outward beyond the set of arms.

5. The assembly of claim 1, wherein the latch overlaps along its ends.

6. The assembly of claim 1, wherein the latch is tensioned to remain in a closed orientation at rest.

7. The assembly of claim 1, wherein the hinge is configured to include one or more locking positions, the locking positions set the arm portion at a particular angle relative to the tray portion.

8. The assembly of claim 1, wherein the arm portion and the tray portion fold together along the hinge such that the lower surface of the tray portion and a lower surface of the arm portion face each other.

9. The assembly of claim 8, wherein the attachment member extends between the set of arms.

* * * * *